Aug. 12, 1941.   D. O. SPROULE   2,252,275
ECHO SOUNDING INSTALLATION
Filed March 21, 1939   3 Sheets-Sheet 1

Donald Orr Sproule
INVENTOR
his ATT'Y,

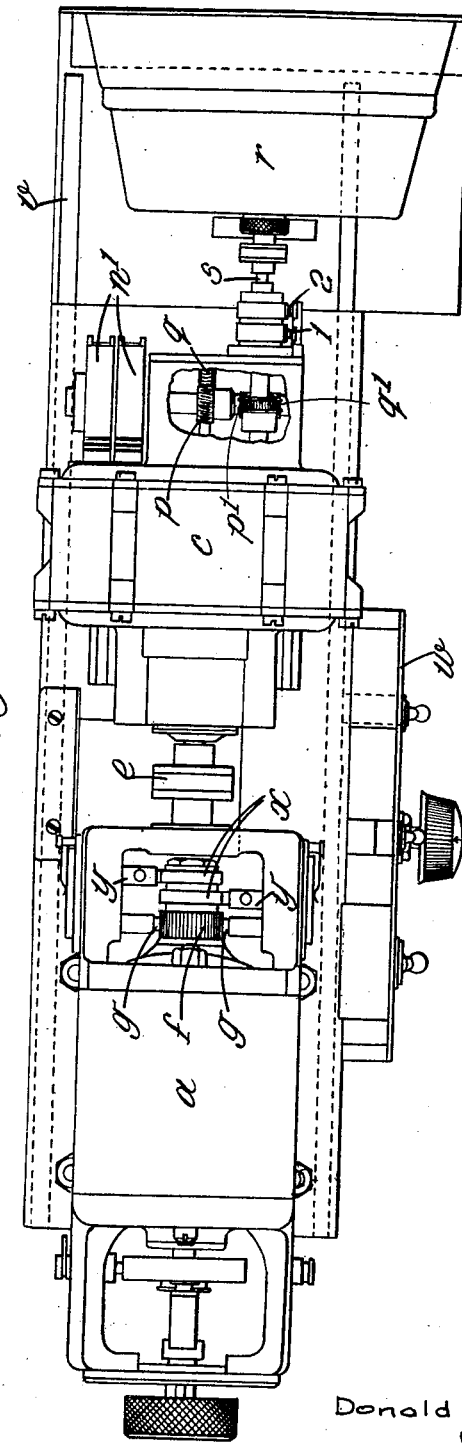

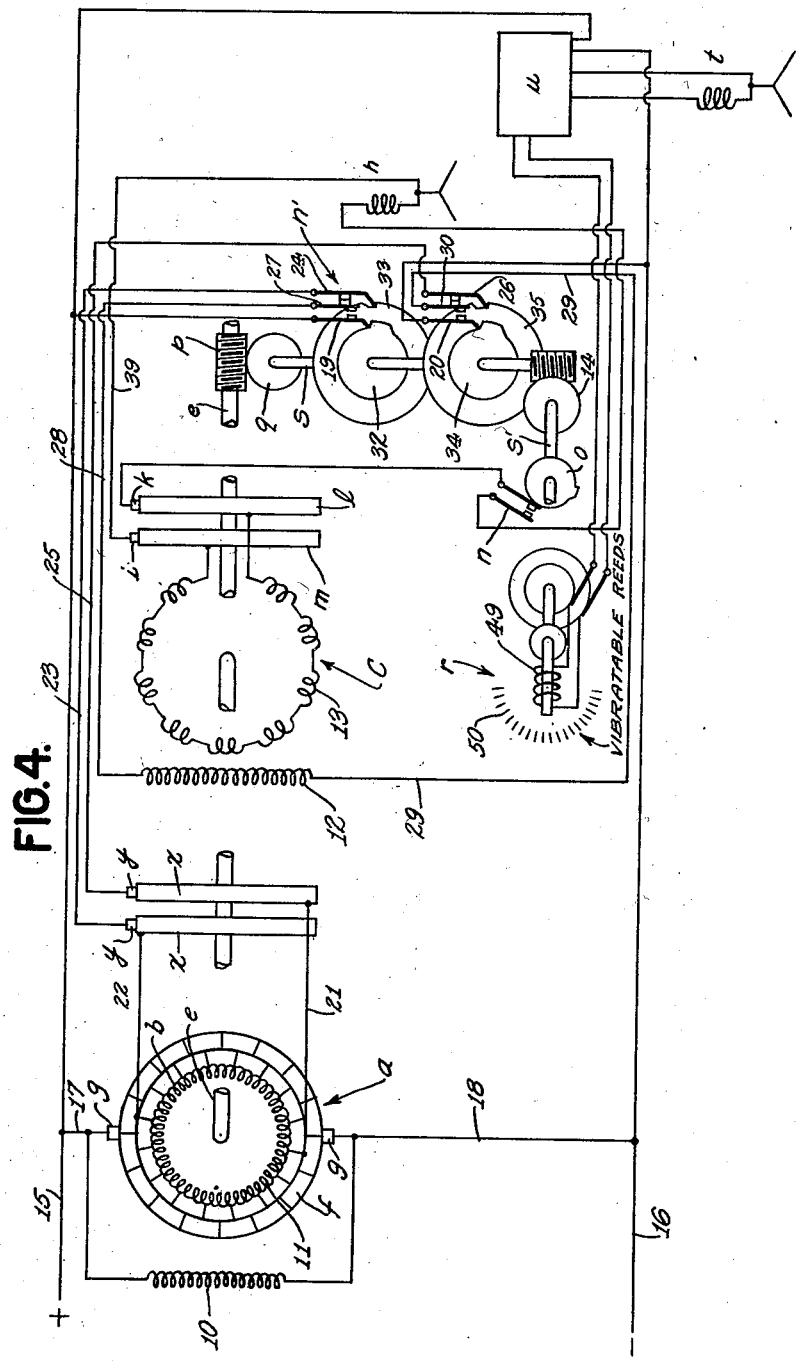

Patented Aug. 12, 1941

2,252,275

UNITED STATES PATENT OFFICE 2,252,275

ECHO SOUNDING INSTALLATION

Donald Orr Sproule, London, England, assignor of one-third to Arthur Joseph Hughes, Essex, England, and one-third to Henry Hughes & Son Limited, London, England, a British limited liability company Application March 21, 1939, Serial No. 263,152
In Great Britain March 16, 1938

2 Claims. (Cl. 177—386)

This invention relates to improvements in echo sounding installations and has for its object to simplify the usual arrangement, to reduce the weight and cost of the mechanism necessary, and to increase the reliability and accuracy of such an installation.

Known echo sounding installations of the kind to which this invention relates comprise a sound pulse transmitter an electrical generator operated by an electromotor for energising and controlling such transmitter, a sound pulse receiver capable of converting the echo pulse to an electrical pulse, a thermionic amplifier for said electrical pulse, an indicator and/or recorder showing the period of time elapsing between the emission of a sound pulse and the reception of the echo pulse, and an electromotor for operating said indicator and its associated switches.

The invention consists in improvements in echo sounding installations of the kind described and is characterised in that the succession of time spaced electrical pulses producing the signal and the formulation of the time base for the indicator and/or recorder of the electrical pulses converted from the received echoes is produced by a single electromotor.

When carrying the invention into practical effect many forms of construction and variations of arrangement may be employed and consequently the following description must be regarded as by way of example only.

In the drawings:

Figure 3 is a plan view showing one arrangement of parts by way of example; and

Figure 4 is a diagrammatic showing of a typical form of impulse generator together with a mechanically actuated indicator and recorder.

Figure 1:
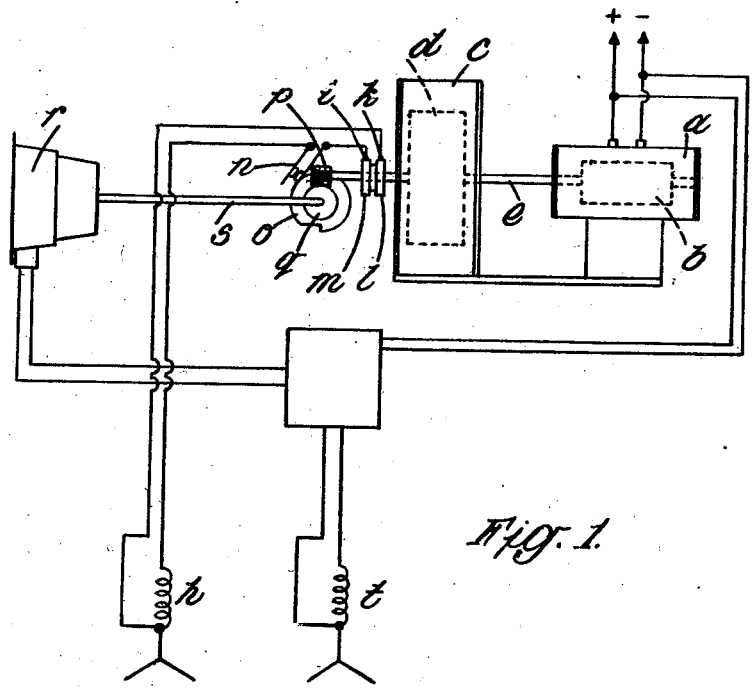
Figure 1 is a diagram showing an arrangement including a mechanically actuated indicator.

As shown in the drawings $a$ is a constant speed electromotor, $b$ the armature thereof, $c$ a generator, $d$ the rotor thereof and $e$ a shaft common to the armature $b$ and rotor $d$.

The electromotor $a$ usually is shunt wound and the armature $b$ is provided with a commutator $f$ and cooperating brushes $gg$ (Figure 3).

Figure 2:
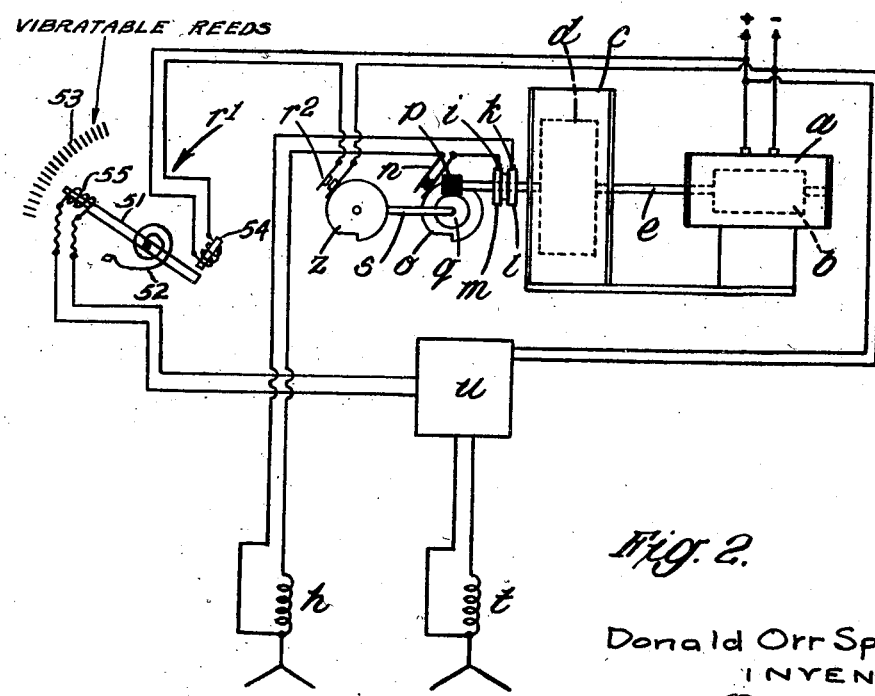
Figure 2 is a diagram showing an arrangement including an electrically actuated indicator.

The generator $c$ produces impulses for energising a sound transmitter $h$ and as shown in Figures 1 and 2 the impulses are conveyed through the brushes $i$ and $k$ and slip rings $l$ and $m$ mounted on the shaft $e$.

The timing of the emitted signals is effected by the transmitter switch $n$ (shown as a pair of contacts) operated by a cam $o$ rotated by the shaft $e$ through the intermediation of velocity ratio gearing such as the worm $p$ on the shaft $e$ and the worm wheel $q$ connected to the cam $o$.

The worm wheel $q$ and cam $o$ are mounted on a shaft which as shown in Figure 1 is the driving spindle $s$ of an indicator $r$, which is arranged and operated as described in United States Patent 2,129,155, in conjunction with a sound receiver $t$ and thermionic amplifier $u$ and which as shown in Figure 3 carries an auxiliary worm $p^1$ cooperating with an auxiliary worm wheel $q^1$ mounted on the driving spindle $s$ of the indicator $r$ so as to obtain the requisite velocity ratio in a compact arrangement.

From the above it will be seen that all the mechanical parts and switches of an echo sounding installation can be operated by a single speed governed electromotor $a$ and that where compactness is of importance, for instance in an echo altimeter for aircraft, all the parts can be arranged on a framing or bedplate $v$, as shown in Figure 3, which also supports the control panel $w$ carrying such details as the motor starting and field resistances, the main switch and such like, thus forming a unit which can be installed and replaced quickly and without difficulty or disturbance of other equipment.

As shown in Figure 4, the generator $c$ is of the type disclosed in my application Serial No. 263,153, filed March 21, 1939, now Patent No. 2,101,809, dated February 27, 1940. The generator includes the electromotor $a$ and the alternating current generator $c$. The motor $a$ includes a field winding 10, the armature winding 11, a commutator $f$ and brushes $g$, $g$ while the generator $c$ includes a field winding 12, and inductive winding 13, slip rings $m$ and $l$ cooperating with the brushes $i$ and $k$, respectively. The armature $b$, the winding 13, slip rings $m$ and $l$ and an additional pair of slip rings $x$, $x$ are mounted on a common shaft $e$ which has the worm $p$ at one end. The worm $p$ engages a worm gear $q$ mounted on the shaft $s$ which carries the cams for actuating the main switch $n^1$ and the transmitter control switch $n$. The shaft $s$ is also coupled through a worm and worm gear drive 14 to the indicator drive shaft $s'$.

The electrical connections between the motor $a$, the generator $c$, the transmitter $h$ and the receiver $t$ are as follows:

The mains 15 and 16 are connected to the brushes $g$ and $g$ engaging the commutator $f$ of the motor by the conductors 17 and 18 and to the field winding 10 in shunt. The main 15 is connected also to the contact blade 19 and the amplifier $u$. The main 16 is connected to the contact blade 20 and the amplifier $u$.

Diametrically opposite points of the armature winding 11 are connected by the conductors 21 and 22 to the slip rings $x$, $x$. One of the brushes $y$ is connected by a conductor 23 to the contact blade 24 and the other brush $y$ is connected by the conductor 25 to the contact blade 26.

A contact blade 27 is disposed between the blades 19 and 24 and is connected by a conductor 28 to one end of the field winding 12. The other end of the winding 12 is connected by a conductor 29 to a contact blade 30 between the blades 20 and 26.

The blade 19 is moved into and out of contact with the blade 27 by a cam 32 and the blade 24 is moved into and out of contact with the blade 27 by a cam 33, both cams being fixed to the shaft S. Similarly blades 20 and 26 are moved into and out of contact with the blade 30 by means of the cams 34 and 35, respectively.

The armature 13 of the generator is connected to the slip rings $m$ and $l$. The brush $i$ is connected to the transmitter $h$ by a conductor 39 and the brush $k$ is connected to a switch blade $n$. The other blade $n$ is connected to the transmitter $h$. The blades $n$, $n$ are moved into and out of contact by means of the cam O which is fixed to the shaft S'.

The cams 32, 33, 34, 35 and O are so shaped and timed relatively to one another that during the formation of an impulse the cams 32 and 34 raise the blades 19 and 20 until they contact the blades 27 and 30, thus connecting the winding 12 to the mains 15 and 16.

The cams 33 and 35 are so set in relation to the slip rings $x$, $x$ that the cams allow the blades 24 and 26 to fall and come into contact with the blades 27 and 30 when the voltage at the brushes $y$, $y$ is at its maximum, i. e., equal to the mains voltage; instantaneously the blades 19, 27 and 24 are in contact with one another but as the blades are of the same potential no burning or arcing takes place which condition also applies to blades 20, 26 and 30 which are in contact with one another at the same time.

After a brief space of time, the cams 32 and 34 allow the blades 19 and 20 to break contact with the blades 27 and 30, but the contact between the blades 27 and 24 and the blades 30 and 26 is maintained until the potential applied to the brushes $y$, $y$ has been reversed a sufficiently long time to reduce the current in the winding 12 to zero.

The switch $n$ is closed by the cam O in timed relation to the generation of the impulses so that the transmitter circuit is closed when a high potential pulse is generated.

The indicator $r$ may be of the type disclosed in my Patent No. 2,129,155, consisting of an electromagnet 49 mounted on the shaft S' and energized by the echo impulses at the receiver $t$ to vibrate the resilient indicating reeds 50 which give a persistent indication of the arrival of the echo at the receiver.

The arrangement diagrammatically shown in Figure 2 is somewhat similar to that shown in Figures 1 and 4 but the mechanically actuated indicator $r$ has been replaced by an electrically actuated indicator $r^1$ of the kind described in my application No. 155,066, filed July 22, 1937. In this arrangement the shaft $s$ is provided with a cam $z$ actuating the switch $r^2$ which controls the flow of electrical energy from the mains to the indicator $r^1$.

The indicator $r^1$ consists of an oscillatory member 51 which is controlled in its movement by a spring 52. The member 52 is normally retained adjacent the left-hand end of the scale 53 by an electromagnet 54 connected to the electric mains through the switch $r^2$. Just before the contacts $n$ are closed to transmit a signal the switch $r^2$ opens, releasing the member 51 which swings across the scale 53. The member 51 is provided with an electromagnet 55 which is connected to the amplifier $u$ and is energized thereby when an echo impulse is received. The magnetic impulse causes certain of the reeds forming the scale 53 to vibrate giving a signal indicating the time or depth measured.

It will be understood from the preceding description that the device of the present invention is capable of considerable modification and that the forms of the invention disclosed are illustrative only.

I claim:

1. In an echo sounding device, the combination of a frame, an electric motor on said frame having a shunt-connected field winding and an armature, a shaft supporting said armature, slip rings on said shaft connected to opposite points of the armature winding, a generator for generating electrical impulses in spaced time relationship having a field winding, brushes connecting the ends of said field winding with said slip rings, a switch actuated by said shaft for intermittently interrupting the connection between said brushes and said field winding, a drive coupling between said armature shaft and said generator, a second shaft mounted in said frame, reduction gearing interposed between said second shaft and said armature shaft for rotating said second shaft at a predetermined speed, second switching means actuated by said second shaft for connecting said generator and a wave impulse transmitter as said electrical impulses are being generated and disconnecting said transmitter and said generator during the intervals between energization of said transmitter, an echo impulse receiver, and an indicator controlled by said motor and said echo impulse receiver for indicating the reception of an echo impulse by said receiver.

2. In an echo sounding device, the combination of a frame, an electric motor on said frame having a shunt connected field winding and an armature, a shaft supporting said armature, slip rings on said shaft connected to opposite points of the armature winding, a generator on said frame for generating electrical impulses in spaced timed relationship having a field winding, brushes connecting the ends of said field winding with said slip rings, a switch actuated by said shaft for intermittently interrupting the connection between said brushes and said field winding, a drive coupling between said armature shaft and said generator, a second shaft mounted in said frame, reduction gearing interposed between said second shaft and said armature shaft for rotating said second shaft at a predetermined speed, a wave impulse transmitter, second switching means actuated by said second shaft for connecting said generator and said wave impulse transmitter as said electrical impulses are being generated and disconnecting said transmitter and said generator during the intervals between energization of said transmitter, a third shaft actuated by said second shaft, an indicator having an indicating member rotated by said third shaft, an echo impulse receiver, and means actuated by said echo impulse receiver for indicating the interval between transmission of a wave impulse and reception of an echo impulse.

DONALD ORR SPROULE.